United States Patent
Barber (10) Patent No.: US 6,289,318 B1
(45) Date of Patent: Sep. 11, 2001

(54) METHOD AND ARCHITECTURE FOR MULTI-LEVEL COMMISSIONED ADVERTISING ON A COMPUTER NETWORK

(76) Inventor: Timothy P. Barber, 11931 Chalon La., San Diego, CA (US) 92128

(*) Notice: Subject to any disclaimer, the term of this patent is extended or adjusted under 35 U.S.C. 154(b) by 0 days.

(21) Appl. No.: 09/275,696

(22) Filed: Mar. 24, 1999

Related U.S. Application Data (60) Provisional application No. 60/079,223, filed on Mar. 24, 1998.

(51) Int. Cl.$^7$ .................................................. G06F 17/60
(52) U.S. Cl. ............................................................ 705/14
(58) Field of Search ................................. 705/14, 26, 40; 235/380, 384; 707/2, 5

(56) References Cited

U.S. PATENT DOCUMENTS

| | | | |
|---|---|---|---|
| 5,537,314 | * | 7/1996 | Kanter .................................... 705/14 |
| 5,666,416 | | 9/1997 | Micali ..................................... 380/23 |
| 5,677,955 | | 10/1997 | Doggett et al. ......................... 380/24 |
| 5,708,780 | | 1/1998 | Levergood et al. ............. 395/200.12 |
| 5,715,314 | | 2/1998 | Payne et al. ............................ 380/24 |
| 5,724,424 | | 3/1998 | Gifford ................................... 380/24 |
| 5,897,621 | | 4/1999 | Boesch et al. .......................... 705/26 |
| 5,991,740 | * | 11/1999 | Messer ................................... 705/27 |
| 6,014,635 | * | 1/2000 | Harris et al. ............................ 705/14 |
| 6,029,150 | * | 2/2000 | Kravitz ................................... 705/39 |
| 6,092,053 | * | 7/2000 | Boesch et al. .......................... 705/26 |
| 6,128,599 | * | 10/2000 | Walker et al. .......................... 705/14 |

FOREIGN PATENT DOCUMENTS

WO 00/77691 * 12/2000 (WO) ..................................... 705/14

OTHER PUBLICATIONS

"SubScrip—An efficient protocol for pay–per–view payments on the Internet," Andreas Furche & Graham Wrightson, Dept. of Computer, Science, U. of Newcastle, Oct. 16, 1996.

"PayWord and MicroMint: Two simple micropayment schemes," Ronald L. Rivest* and Adi Shamir**, *MIT Laboratory for Computer Science, **Weizmann Institute of Science, May 7, 1996, pp. 1–18.

"iKP—A Family of Secure Electronic Payment Protocols," IBM Research, Mar. 15, 1995 pp. 1–17.

"Mini–Pay: Charging per Clickon the Web," IBM Research–Haifa Research Lab–Tel–Aviv Annex Apr. 10, 1997, pp 1–20.

"Millicent: Frequently Asked Questions," Apr. 15, 1997, pp. 1–3.

"Millicent–specific elements for an HTTP payment protocol," Apr. 15, 1997, pp 1–8.

"The State of the Art in Electronic Payment Systems," N. Asokan et al, *Computer*, Sep. 1997, pp. 28–35.

(List continued on next page.)

*Primary Examiner*—Stephen Gravini
(74) *Attorney, Agent, or Firm*—Ware, Fressola, Van Der Sluys & Adolphson, LLP (57) ABSTRACT

A method and architecture for rewarding a merchant that operates a server on a computer network, and in particular on the Internet, when a consumer accesses the server and later access a server of a paying merchant, i.e. a merchant who has agreed to provide a reward to one or more of the merchants the consumer accessed on the way, in tracing a course through the network, to accessing the paying merchant. The invention involves having a service operate servers, on the computer network, that automatically distribute any reward provided by a paying merchant. The method is not intended to reward all merchants visited by a consumer on the way to a paying merchant; it distributes rewards only approximately, trading off accuracy for a lower burden of computation.

9 Claims, 3 Drawing Sheets

OTHER PUBLICATIONS

"Internet Micro-payment Protocols," by Chris A. Owen, date unknown (but prior to Jun. 9, 1977).

Downloaded information from "Cookie Central" website on the Internet, downloaded May 30, 1997.

"Micropayment Schemes Promise to Make the Web Profitable—One Penny at a Time," by Eric Brown, NewMedia, Jun. 23, 1997, pp. 1–7.

* cited by examiner

METHOD AND ARCHITECTURE FOR MULTI-LEVEL COMMISSIONED ADVERTISING ON A COMPUTER NETWORK

CROSS-REFERENCE TO RELATED APPLICATIONS

This application claims priority from Provisional Application No. 60/079,223, filed Mar. 24, 1998.

FIELD OF THE INVENTION

The present invention pertains to the field of advertising on a computer network. More particularly, the present invention concerns how to reimburse a merchant operating an Internet server when a consumer has accessed the Internet server and then later accesses another Internet server operated by another merchant who has agreed to pay a referral fee.

BACKGROUND OF THE INVENTION

There are currently a number of advertising services in use on the Internet today. These advertising services facilitate buying and selling advertising space on merchant web sites. If a merchant wishes to buy advertising space (i.e. wishes to pay to have advertisements displayed on other web sites), the merchant contracts such an advertising service, negotiates a contract, and pays according to terms of the contract. If a merchant wishes to sell advertising space (i.e. wishes to get something of value in exchange for displaying advertisements for other merchants), the merchant registers with such an advertising service, then places special advertisement hyperlinks on the merchant's web site.

The term merchant is used here to indicate the owner or operator of a (computer) server linked to a network, such as the Internet, and able to publish information on the network. The information published by a first merchant could be pay-per-view information or an advertisement of goods and services offered by a first merchant, or the information could be an advertisement of goods and services offered by a second merchant, i.e. a referral to the second merchant. Various advertising systems have been developed to compensate a merchant for providing a referral to another merchant.

In many advertising systems, compensation to merchants who sell advertising space (i.e. who advertise for other merchants) is computed in one of three ways: per impression, per visitor, or per sale. Often an advertising service computes and distributes compensation. In the per impression way of computing compensation, such an advertising service counts the number of unique consumers who view the advertisement, and the merchant receives a fixed fee for each. Advertising services that use this method are currently located at the following web sites: http://www.doubleclick.com; http://www.hyperbanner.com; http://www.linkexchange.com; and http://www.smartclicks.com.

In the per visitor (consumer) way of computing compensation, an advertising service counts the number of unique consumers who click on the advertisement, and the merchant receives a fixed fee for each. Advertising services that use this method include: http://www.aaddzz.com; http://www.bannerbrokers.com; http://www.clicktrade.com; and http://www.eads.com.

In the per sale way of computing compensation, a merchant receives a commission when a consumer clicks on an advertising linking the consumer to the server of a merchant and the consumer subsequently purchases goods or services from the merchant through the linked access.

On the Internet, computers access each other through the World Wide Web, a kind of network operating system. In this system, servers and consumer computers are said to reside at web sites. In the prior art of Internet advertising methods, it is common to use some standard procedure for identifying a consumer, or a consumer's computer, so as to track when the consumer accesses a merchant's web site, or when the consumer moves from one web page of a merchant (a quantity of intermission at a web site) to another (at possibly another web site). The tracking is performed by software put in place by the advertising service.

An advertising service may host, on a server operated by the advertising service, an actual advertisement for a merchant, as opposed to a link to an advertisement for the merchant. Then when a consumer selects to view, from a server operated by the merchant, a web page including an advertisement, the advertisement (i.e. the code for constructing its image for display as part of the web page) is actually pulled from the server of the advertising service by means of a link to the advertisement (in the code on the server, operated by the merchant, for constructing the web page). Thus, in an arrangement like this, the advertising service can record access by a consumer to an advertisement.

Alternatively, an advertising service may set up, on a first server operated by the advertising service itself, an advertisement for a merchant's web page stored on a server operated by the merchant, but which includes a link to a second server operated by the advertising service. Then a consumer who accesses the first server and selects to view the web page is directed to the second server operated by the advertising service, which then directs the consumer to the server operated by the merchant where the advertised web page is located. In this arrangement, the second server of the advertising service records access by the consumer of the advertised web page of the merchant.

Recording an access of an Internet server or of a web page on an Internet server is a feature of many commercial web servers. In providing this recording, such a web server may set, on consumer's computer, a so-called cookie (i.e. a persistent state data object, as described e.g. in U.S. Pat. No. 5,774,670) that distinguishes the consumer from other consumers, at least for subsequent accesses to a server in the same second-level Internet domain as the cookie-issuing web server. In the context of the present invention, a cookie is a data object that resides on a consumer's computer and can be updated by the web server that set the cookie on the consumer's computer. Such updating is performed to record, for example, a total number of visits, each visit by the consumer to the cookie-issuing web server. Whether or not a cookie is used in tracking a consumer, a web server may append, for later inspection, information about the consumer's computer (such as its network address) to a local log file (in memory or on storage media). Such consumer tracking is widely used, and is regarded as a valuable source of marketing information.

Thus, the consumer activity on the web leading up to viewing a merchant's web page does not flow according to any one particular structure at the code level; there are many ways a consumer might arrive at a web page, depending on what mechanisms the merchant and advertising service chose to use. In addition, there are many tracks through the web a consumer might take in ending up at a particular web site having a web page the consumer wants to view. A consumer might arrive at a web site by first looking up information in a directory service or search engine. Or a consumer might arrive at a web site by following a helpful sequence of hyperlinks, possibly pointing to several other merchant web sites in the process.

Because of this diversity of activity leading to a consumer viewing a particular web page, there is currently no robust mechanism to determine how the owner of the particular web page might compensate or credit merchants whose web sites were possibly instrumental in the consumer ultimately viewing the particular web page. What is needed is a way to determine what server-operating merchants to compensate, if any, for a consumer viewing a web page of another merchant who is willing to reward for potential referrals to the web page.

SUMMARY OF THE INVENTION

Accordingly, it is an object of the present invention to determine which server-operating merchants to reward in the event of a consumer accessing a web page of a merchant who desires to make compensation for referrals to the web page. It is a further object of the present invention to determine how much to reward such server-operating merchants.

The present invention achieves this object by a method, for use on a computer network, for distributing a reward from a paying merchant to participating merchants, the paying merchant and participating merchants all operating servers connected to the computer network, the reward to be distributed after a consumer visits a web site of the paying merchant, the method comprising the steps of: recording each access by the consumer of a participating merchant web site, including access by the consumer of the paying merchant web site; accepting referral points issued by a paying merchant when a consumer accesses a pre-determined web site of the paying merchant; and distributing to participating merchants the referral points according to criteria that limit the number of participating merchants, the criteria including a requirement that the consumer have visited a web site of a participating merchant before visiting the pre-determined web site of the paying merchant; wherein the distributing to participating merchants is calculated based on a pre-agreed pass-on percentage for each participating merchant, the pass-on percentage indicating what percentage of any referral points the participating merchant agrees to pass on to other participating merchants who satisfy the criteria for receiving a portion of the referral points.

In a particular embodiment of the present invention, the criteria include a requirement that the consumer visit a participating merchant within a pre-determined time before the consumer visits the pre-determined web site of the paying merchant in order for the participating merchant to be awarded a portion of the referral points.

In another embodiment of the present invention, the criteria include a requirement that after last visiting a participating merchant before the consumer visits the pre-determined web site of the paying merchant, the consumer not visit more than a pre-determined number of other participating merchants in order for the participating merchant to be awarded a portion of the referral points.

In another aspect of the present invention, the above object is achieved by an architecture, for use on a computer network, for distributing a reward from a paying merchant to participating merchants, the paying merchant and participating merchants all operating servers connected to the computer network, the reward to be distributed after a consumer visits a web site of the paying merchant, the architecture comprising: means for recording each access by the consumer of a participating merchant web site, including access by the consumer of the paying merchant web site; means for accepting referral points issued by a paying merchant when a consumer accesses a pre-determined web site of the paying merchant; means for distributing to participating merchants the referral points according to criteria that limits the number of participating merchants, the criteria including a requirement that the consumer have visited a web site of a participating merchant before visiting the pre-determined web site of the paying merchant; wherein the means for distributing to participating merchants uses a pre-agreed pass-on percentage for each participating merchant, the pass-on percentage indicating what percentage of any referral points the participating merchant agrees to pass on to other participating merchants who satisfy the criteria for receiving a portion of the referral points.

In still another aspect of the present invention, the above object is achieved by an architecture, for use on a computer network, for executing a service of distributing a reward from a paying merchant to participating merchants, the paying merchant and participating merchants all operating servers connected to the computer network, the reward to be distributed after a consumer visits a web site of the paying merchant, the architecture comprising: a checkpoint server, for recording each access by the consumer of a participating merchant web site, including access by the consumer of the paying merchant web site; an accounting server, for accepting referral points issued by a paying merchant when a consumer accesses a pre-determined web sire of the paying merchant, and for distributing to participating merchant the referral points according to criteria that limit the number of participating merchants, the criteria including a requirement that the consumer have visited a web site of a participating merchant before visiting the pre-determined web site of the paying merchant; and a merchant database server, for hosting a database of information about each participating merchant needed in performing the service, the information including a pass-on percentage, and for paying merchant also a number of referral points the paying merchant agrees to issue for distribution to participating merchants whenever a consumer visits an indicated web site of the paying merchant.

The present invention greatly extends the prior art notion of advertising on the Internet. The present invention is not intended to reward all merchants visited by a consumer on the way to a paying merchant, or even only those merchant actually instrumental in the consumer's visiting a web site of a paying merchant; it distributes rewards only approximately, making a tradeoff of accuracy for a lower burden of computation. The result is a means of compensating some merchants in a sequence of merchants who (only) potentially referred a consumer to a paying merchant, with little burden on system performance. Because the result provides compensation to more than the merchant operating the web site a consumer visits just before visiting the web site of a paying merchant, the present invention is said to provide multi-level commissioned advertising.

BRIEF DESCRIPTION OF THE DRAWINGS

The above and other features and advantages of the invention will become apparent from a consideration of the subsequent detailed description presented in connection with the accompanying drawings, in which.

DESCRIPTION OF THE INVENTION INCLUDING BEST MODE

Figure 1:
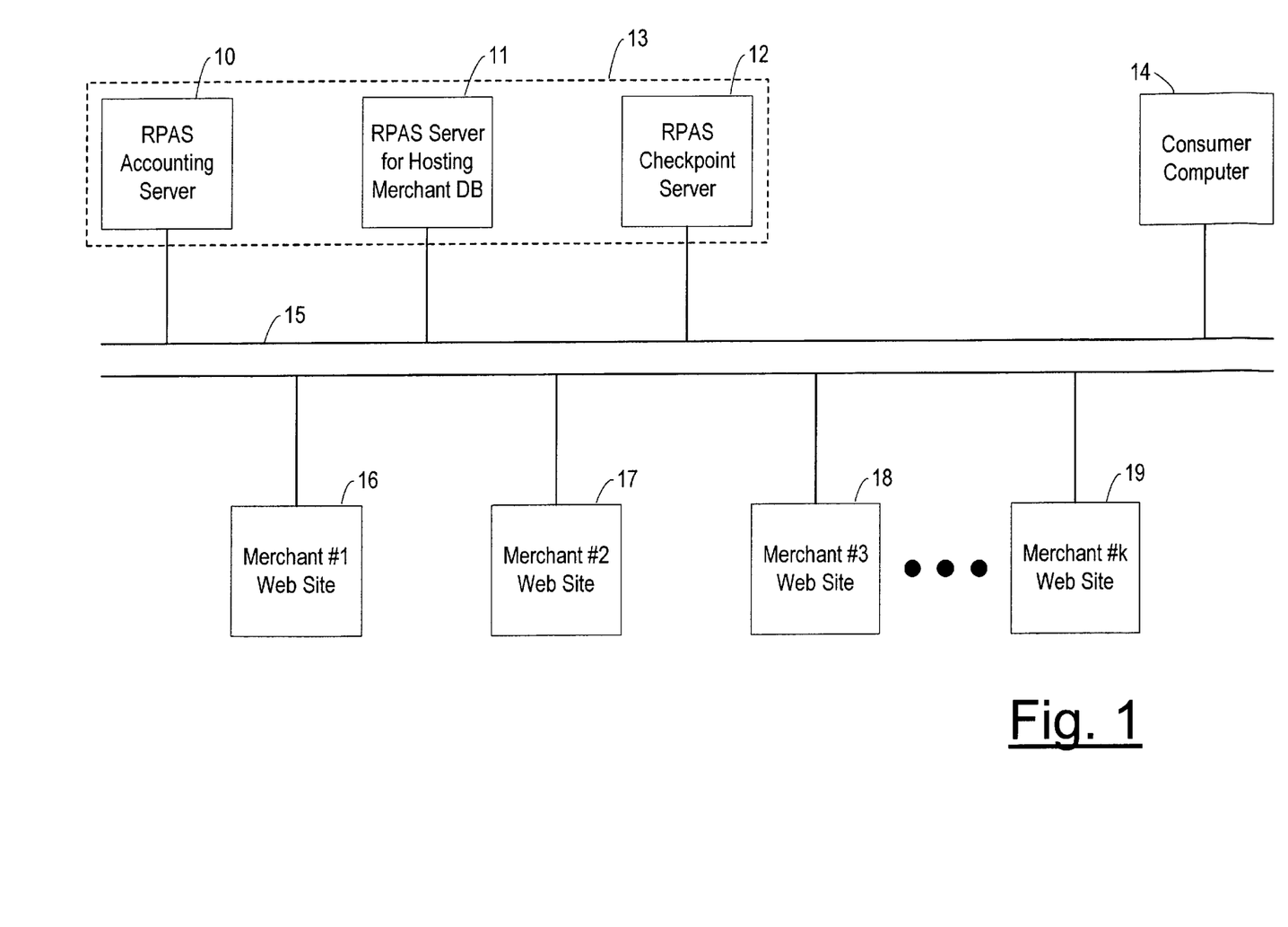
FIG. 1 is a block diagram showing elements of an architecture used in compensating for referrals to a web page, according to the present invention.
Figure 2:
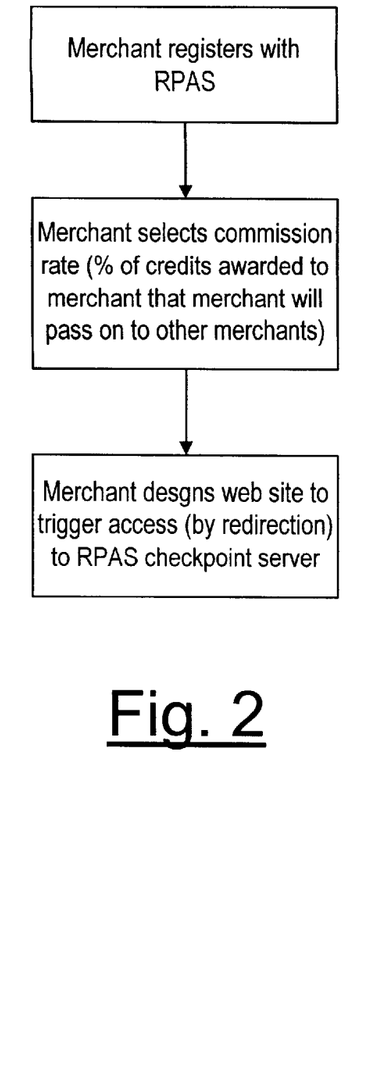
FIG. 2 is a flow chart indicating how, according to the present invention, a merchant prepares to participate in a program providing referral fees.
Figure 3:
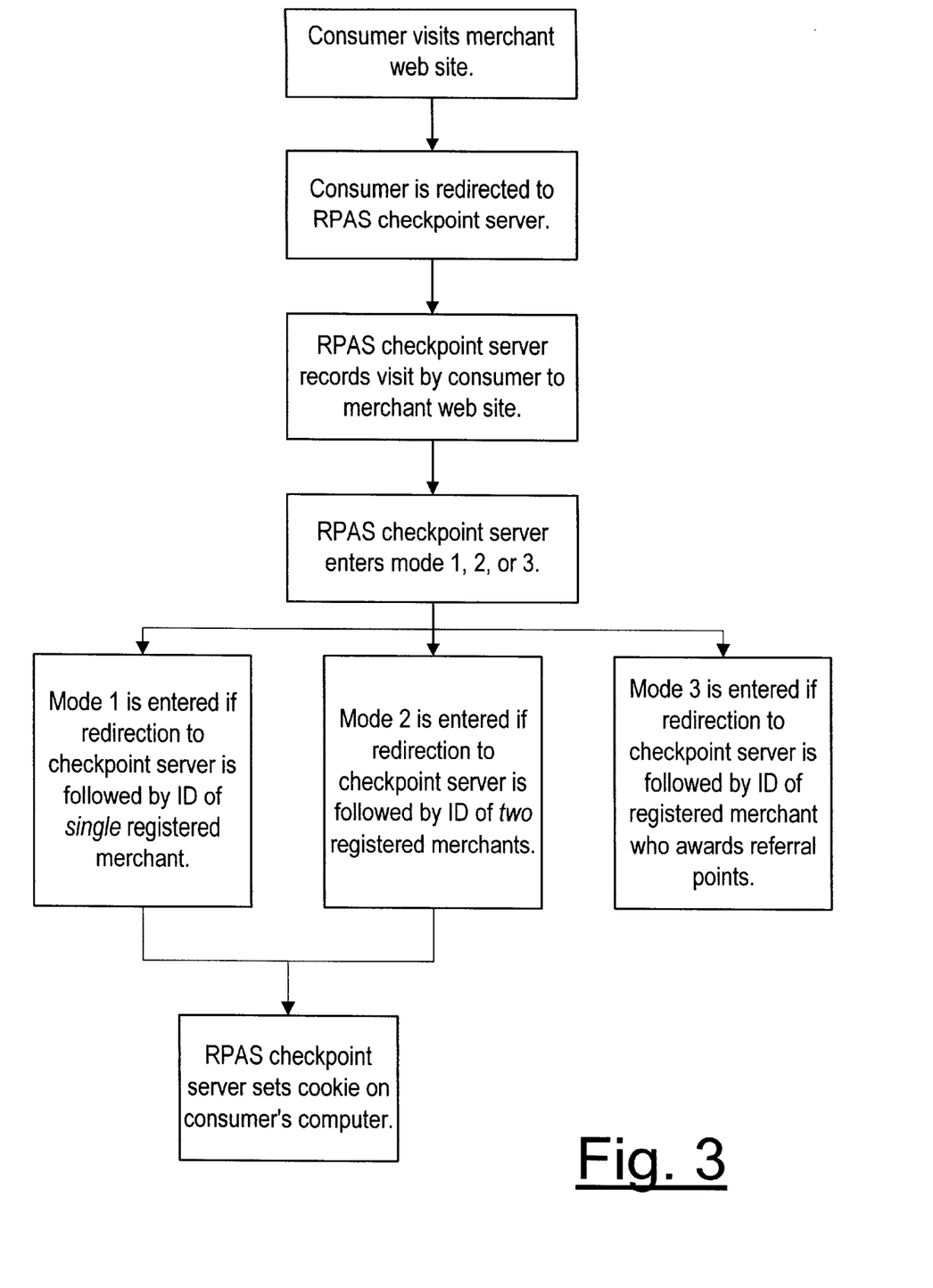
FIG. 3 is a flow chart indicating how, according to the present invention, a merchant prepares to participate in a program providing referral fees.

Referring now to FIG. 1, an architecture 13 for a referral reward program according to the present invention is shown. The program is operated by a referral point awarding service (RPAS). Merchants operating web sites on the Internet 15 register with the RPAS to become registered merchants. The referral award program rewards registered merchants who have potentially referred consumers to the web site of a registered merchant who has agreed to reward referral points through RPAS either when a consumer visits the web site of the paying merchant, or when a consumer has not only visited the web site, but actually purchased goods or services using the web site. Such a registered merchant is called here a paying merchant. The registered merchants who are eligible to receive a portion of the referral points are called here participating merchants. In the best mode, a registered merchant may be a participating merchant in one scenario (when a consumer accesses a server or visits a web site or accesses a particular web page of the registered merchant and eventually visits the web site of a paying merchant), and a paying merchant in another scenario (when a consumer accesses a server or visits a web site or accesses a particular web page of the registered merchant for which the registered merchant has agreed to award referral points). Each referral point represents something of value, such as frequent flyer miles or even money.

For the description provided here, a registered merchant will be either a participating merchant or a paying merchant (but not sometimes one and sometimes the other). But it is to be understood that, in the best mode, a registered merchant who has agreed to award referral points when a consumer ends up accessing material from a server of the registered merchant, can be a participating merchant in case of a consumer visiting some other paying merchant.

The architecture 13 includes various RPAS servers 10–12, connected to the Internet 15, including an RPAS accounting server 10 for awarding referral points when a suitable referral event occurs, an RPAS merchant database server 11 for hosting a database of participating merchants including information about the merchants relevant to the referral reward program, and an RPAS checkpoint server 12 for monitoring visits by consumers to web sites of the registered merchants. In the preferred embodiment, there are several checkpoint servers, each serving different merchants.

Connected to the architecture 13 through the Internet 15 are a consumer computer 14, and merchant web sites 1–k of registered merchants, the web sites indicated as merchant #1 web site 16, merchant #2 web site 17, merchant #3 web site 18, . . . , and merchant #k web site 19. Although other merchants (not shown) might also be connected to the Internet, it is assumed here that the merchants shown are all registered with the RPAS, as described below, and that at least one of these registered merchants is a paying merchant, i.e. one who has agreed to award referral points if a consumer accesses a server of the merchant or visits a particular web site of the merchant.

As a specific example of the present invention in the best mode, which will be described more specifically below, suppose that merchants $m\_1, m\_2, m\_3$, and $m\_4$ are the only merchants registered with RPAS, and suppose merchant $m\_4$ agrees to award $z=10$ referral points when a consumer visits a web site of $m\_4$, and that $m\_1, m\_2$ and $m\_3$ are participating merchants in the scenario of this example. The referral points are to be distributed by RPAS among participating merchants, according to whether each of the other participating merchants is identified as meeting the criteria used in the present invention to award referral points.

As will be described below, each participating merchant has already agreed with RPAS to pass on some percentage of whatever referral points it is awarded. Suppose that the merchants $m\_1, m\_2$ and $m\_3$ have agreed to pass on 30%, 25% and 40%, respectively, of whatever referral points are awarded to them.

Now suppose that a consumer visits the web sites of participating merchants $m\_1, m\_2, m\_3$ and $m\_4$ in that order, although not necessarily consecutively (i.e. the consumer might have also visited other web sites in touring these four web sites). As the consumer visits each of these web sites in turn, a checkpoint server 12 records the visit by entering either mode 1, mode 2, or mode 3, as will be described below. In this scenario, assume that the consumer does not click on an advertisement redirecting the consumer to $m\_4$, but instead simply visits $m\_1, m\_2, m\_3$ and $m\_4$ in turn.

When the consumer computer 14 interfaces with the web site of $m\_4$, the visit prompts $m\_4$'s server to send a request to the checkpoint server 12 to issue $z=10$ referral points. The checkpoint server 12 (operating in mode 3 as described below) then makes available to the accounting server 10 the recorded access information (i.e. that the consumer visited first $m\_1$, then $m\_2$, and so on) as well as the quantity of referral points paid by $m\_4$. Finally, the accounting server 10 computes how to distribute the referral points. Based on the percentages of referral points $m\_1, \ldots, m\_4$ have each agreed to pass on, the accounting server 10, tracing the path of the consumer backwards from $m\_4$, passes on 40% of 10 points ($=4$ points) from $m\_3$ (leaving $m\_3$ with 6 points), passes on 25% of 4 points ($=1$ point) from $m\_2$ (leaving $m\_2$ with 3 points), and there being no more participating merchants to reward, leaves the remaining 1 point with $m\_1$.

It is important to note that nowhere in the example was there a requirement that to earn a reward a merchant must have actually influenced the consumer to visit, sooner or later, the web site of $m\_4$. In fact, the compensation would have been the same even if the consumer has ended up at $m\_4$'s web site purely by chance, i.e. without any suggestion, direct or indirect, by any of the "referring merchants" $m\_1, \ldots, m\_3$. Thus, the method of the present invention for rewarding a participating merchant is based on the assumption that if a consumer visited the web site of a participating merchant and then after not having visited too many other web sites, ended up visiting a web site of a paying merchant, the participating merchant was part of the stream of influence that swept the consumer onto the web site of the paying merchant, and should therefore be awarded. In the best mode, a participating merchant would not receive a distribution of the referral points unless the consumer first visits a web site of the participating merchant, and then visits less than a certain pre-determined number of web sites of participating merchants, not necessarily different web sites, before visiting the web site of the paying merchant.

In another embodiment of the present invention, in order to foreclose as a possibility that a participating merchant would receive all of a distribution of referral points because a consumer repeatedly visits a web site of the participating merchant and then finally visits the web site of the paying merchant, the referral points are distributed to a pre-determined number of different participating merchants. In this embodiment, for purposes of determining whether a particular participating merchant should receive a distribution of the referral points, only the last visit by a consumer to a web site of the participating merchant is taken into account.

In another embodiment, as an alternative to setting a cap on the number of last-visited participating merchants to which referral points are distributed, the present invention also comprehends setting a time limit on when a consumer can have visited a participated merchant and then have visited a paying merchant, to determine whether to award any referral points to the participating merchant. In yet another embodiment, there is both a time limit and a cap on the number of participating merchants that will receive a distribution of any referral points. In this, it is possible that a single participating merchant would receive all of a particular issue of referral points (if a consumer visits only the single participating merchant in the pre-determined time before visiting the paying merchant), and it is also possible that sometimes no referral points are awarded because no participating merchants satisfy the criteria for receiving a portion of an issue of the referral points.

In the best mode, with each participating merchant in the merchant database (maintained by the merchant database server 11) there are associated various items of information, including:

a) a pass-on percentage, indicating, in a distribution of referral points, the percentage of the referral points received by the merchant that the merchant will pass on to other participating merchants;

b) a checkpoint universal resource locator (url), i.e. a network address of the checkpoint server to be used by the merchant (not needed if all merchants use the same checkpoint server); alternatively, instead of a checkpoint url, a checkpoint server domain name (i.e. an alias for a url);

c) at least one gateway url, i.e. a network address specified by the merchant to be the url of a web site of the merchant (the database accommodates a merchant having multiple web sites by using a relational database structure);

d) an account balance, indicating the current total number of referral points earned by the merchant (and not yet redeemed); and e) a merchant identification, as a string of characters unique to the merchant, used for identifying the account holding the referral points for the merchant.

In the preferred embodiment, a merchant registers with RPAS (e.g. via phone, fax, email, or web) and selects a pass-on percentage. Each participating merchant then designs its web sites to trigger access by a consumer to the merchant's checkpoint server, using known methods of redirection in which a consumer is caused to access a merchant's checkpoint server by providing the consumer's computer with the checkpoint url, along with appended information.

In the preferred embodiment, a checkpoint server can operate in any of three modes whenever a consumer visits a participating or paying merchant. The particular mode used by the checkpoint server depends on what merchants the consumer visits. In the preferred embodiment described here, the consumer visits web sites on the Internet and accesses web pages of servers operated by participating and paying merchants. The different modes will be here described in the preferred embodiment.

Mode 1 is entered by an RPAS checkpoint server when a consumer accesses a specially programmed web page of a participating merchant. The participating merchant will have embedded in the web page a data object that must be retrieved from a server operated by the RPAS in order for a browser, operated by the consumer on the consumer's computer, to build up the web page on the consumer's computer. The retrieval of such a data object from an RPAS server provides RPAS with the information it needs to track the consumer, i.e. to note that the consumer visited the particular participating merchant at a particular time. Mode 3 is entered in circumstances identical to those of mode 1, except that in mode 3 the consumer has visited a paying merchant, instead of a web page of merely a participating merchant. (Remember, both participating and paying merchants are "registered" with RPAS, and a registered merchant can be either a paying merchant or a participating merchant, depending on whether a consumer accesses a web page for which the registered merchant has agreed to award referral points.)

Mode 2 is entered by an RPAS checkpoint server when a consumer visits a web page of a participating merchant who embeds in the web page a data object that directs the consumer to another participating merchant, in what amounts to a true referral, but that first directs the consumer to an RPAS checkpoint server so that RPAS can note that the consumer first visited to the referring participating merchant, and then visited the referred to participating merchant.

In mode 1, the url of the checkpoint server provided to the consumer computer is followed by appended information that includes the identification of a single registered merchant, and the checkpoint server records that the consumer visited the identified merchant. Additionally, the checkpoint server sets a cookie (the persistent data object described above) on the consumer computer; the cookie has a timestamp and has the merchant identification appended to it. In applications where security is an important enough issue, the cookie is either encrypted or followed by an authentication string. After setting the cookie, the checkpoint server returns to the consumer computer a data object (essentially a web page and any associated information and scripts).

In mode 2, the checkpoint server address is followed by the identification of two registered merchants. The checkpoint server records that the consumer visited the first merchant, and then proceeded to the second merchant. Additionally the checkpoint server sets a cookie, with a timestamp and the two merchant identifications appended, on the consumer computer. The checkpoint server returns to the consumer computer data including a redirection causing the consumer computer to access the gateway url of the second merchant.

In mode 3, the checkpoint server address is followed by the identification of a single participating merchant and a number of referral points. The address also includes, in the best mode, a maximum number of participating merchants whom the paying merchant will compensate counting back from the participating merchant most recently visited by the consumer before visiting the paying merchant, and counting each participating merchant only once. Alternatively, the address may instead include the value of a length of time, understood to be measured backward in time starting from when the consumer visits the web site of a paying merchant, beyond which a visit to a participating merchant by a consumer who later visits the paying merchant will not entitle the participating merchant to a share of any referral points made available by the paying merchant. (Here, a visit by a consumer to a merchant is intended to be understood to mean access by a consumer computer to a merchant web site.) The checkpoint server then proceeds as in mode 1, and also records a payment record (z,m,c,t,{n or s}) indicating that z points have been provided to merchant m by virtue of consumer c accessing the paying merchant's server at time t, and should be distributed among the most recent n participating merchants visited by the consumer, or among all participating merchants visited by the consumer within the s seconds previous to the consumer visiting the paying merchant.

One skilled in the art can understand how to use the access records created by the checkpoint servers to construct a database of consumer movements. Specifically, for each consumer who has triggered an access to a checkpoint server, one can list the participating merchants the consumer has visited, in chronological order.

For each payment record (z,m,c,t,{s or n}), using information obtained from the one or more checkpoint servers 12, the accounting server 10 considers the (possibly and acceptably incomplete) sequence of participating merchants accessed by consumer c. To eliminate anomalous behavior, in the preferred embodiment the accounting server may first filter through the sequence of participating merchants to remove those the consumer visited more than s second earlier than time t (when the consumer visited the paying merchant), and then removing all but one occurrence, such as the earliest occurrence, of each remaining participating merchant. In the case of using a maximum number n of to-be-compensated merchants, the RPAS accounting server filters out merchants visited by the consumer c earlier than the last n different participating merchants. Either way, the result of the filtering is a usually shortened list of merchants: $m\_1, m\_2, \ldots, m\_k$, where $m\_1$ is the paying merchant, and $m\_k$ is the first participating merchant the consumer visits after time t-s, or no more than the $n^{th}$ different participating merchant the consumer visits before visiting the paying merchant $m\_1$. (So the path of the consumer backward in time, is: $m\_1$ (the paying merchant), then $m\_2$, and so on back to $m\_k$.

Figure 4:
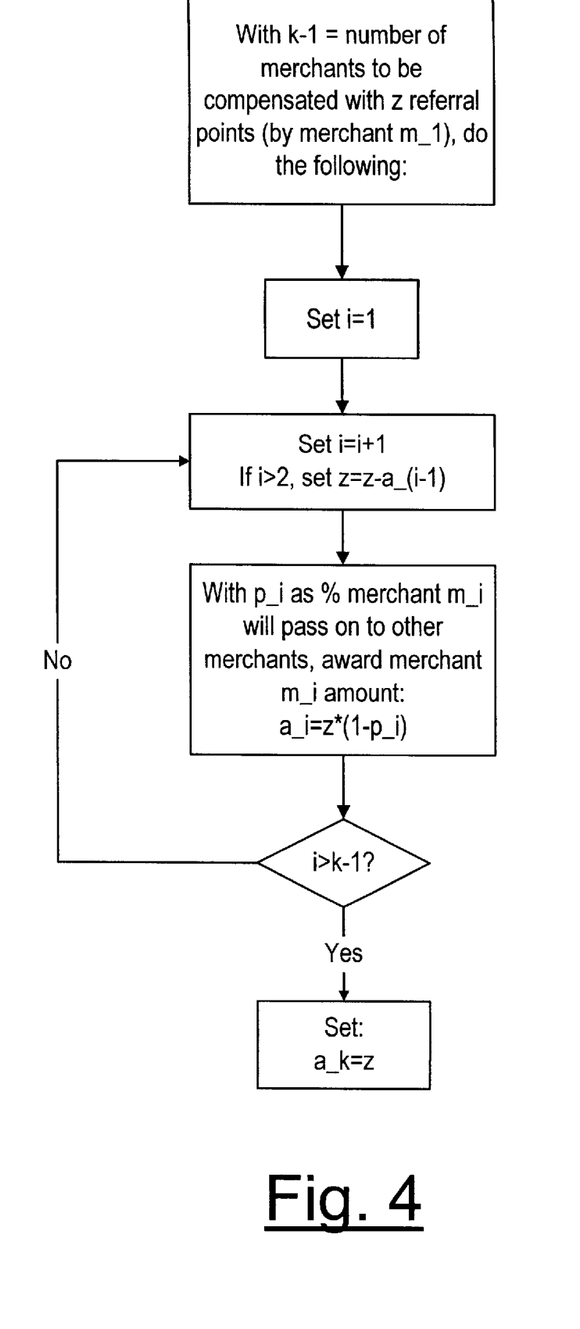
FIG. 4 is a flow chart showing one way according to the present invention to compensate merchants for referring a consumer to a web page of another merchant.

The accounting server 10 next redistributes the z referral points to the merchants in the filtered list according to one or another algorithm. In the best mode, the accounting server distributes the referral points among the participating merchants earning referral points based on the pass-on percentage of each such merchant, as in the example discussed above (involving $m\_1, \ldots, m\_4$, where $m\_1$ is the paying merchant, and $m\_2$ is the participating merchant the consumer visited just before visiting the paying merchant $m\_4$, and so on). Such a distribution is expressed algorithmically in FIG. 4. In addition to the procedural steps shown in FIG. 4, the accounting server may perform rounding up or down of referral points to be awarded, or may deduct service charges.

Note that the accounting server 10 has all the information needed to prepare a pass-on list, i.e. a list providing referral points passed on to others by each participating merchant during a predetermined time interval. Thus, the RPAS can prepare such a list for use by the registered merchants to help them determine how to optimize the value of the referrals they make.

It is to be understood that the above described arrangements are only illustrative of the application of the principles of the present invention. In particular, the present invention is intended to comprehend criteria for determining which participating merchants should receive at least some of an issue of referral points can be fashioned where the criteria include the possibility that even if only a single participating merchant is eligible, only a fraction of the issued referral points are distributed. Numerous other modifications and alternative arrangements may be devised by those skilled in the art without departing from the spirit and scope of the present invention, and the appended claims are intended to cover such modifications and arrangements.

What is claimed is:

1. A method, for use on a computer network, for distributing a reward from a paying merchant to participating merchants, the paying merchant and participating merchants all operating servers connected to the computer network, the reward to be distributed after a consumer visits a web site of the paying merchant, the method comprising the steps of:
  a) recording each access by the consumer of a participating merchant web site, including access by the consumer of the paying merchant web site;
  b) accepting referral points issued by the paying merchant when a consumer accesses a pre-determined web site of the paying merchant; and
  c) distributing to participating merchants the referral points according to criteria that limit the number of participating merchants, the criteria including a requirement that the consumer have visited a web site of a participating merchant before visiting the pre-determined web site of the paying merchant; and wherein the distributing to participating merchants is calculated based on a pre-agreed pass-on percentage for each participating merchant, the pass-on percentage indicating what percentage of any referral points the participating merchant agrees to pass on to other participating merchants who satisfy the criteria for receiving a portion of the referral points.

2. The method claimed in claim 1, wherein the criteria include a requirement that the consumer visit a participating merchant within a pre-determined time before the consumer visits the pre-determined web site of the paying merchant in order for the participating merchant to be awarded a portion of the referral points.

3. The method claimed in claim 1, wherein the criteria include a requirement that after last visiting a participating merchant before the consumer visits the pre-determined web site of the paying merchant, the consumer not visit more than a pre-determined number of other participating merchants in order for the participating merchant to be awarded a portion of the referral points.

4. An architecture, for use on a computer network, for distributing a reward from a paying merchant to participating merchants, the paying merchant and participating merchants all operating servers connected to the computer network, the reward to be distributed after a consumer visits a web site of the paying merchant, the architecture comprising:
  a) means for recording each access by the consumer of a participating merchant web site, including access by the consumer of the paying merchant web site;
  b) means for accepting referral points issued by the paying merchant when a consumer access a pre-determined web site of the paying merchant;
  c) means for distributing to participating merchants the referral points according to criteria that limits the number of participating merchants, the criteria including a requirement that the consumer have visited a web site of a participating merchant before visiting the pre-determined web site of the paying merchant;

wherein the means for distributing to participating merchants uses a pre-agreed pass-on percentage for each participating merchant, the pass-on percentage indicating what percentage of any referral points the participating merchant agrees to pass on to other participating merchants who satisfy the criteria for receiving a portion of the referral points.

5. The architecture of claim 4, wherein the criteria includes a requirement that the consumer visit a participating merchant within a pre-determined time before the consumer visits the pre-determined web site of the paying merchant in order for the participating merchant to be awarded a portion of the referral points.

6. The architecture of claim 4, wherein the criteria includes a requirement that after last visiting a participating merchant before the consumer visits the pre-determined web site of the paying merchant, the consumer not visit more than a pre-determined number of other participating merchants in order for the participating merchant to be awarded a portion of the referral points.

7. An architecture, for use on a computer network, for executing a service of distributing a reward from a paying merchant to participating merchants, the paying merchant and participating merchants all operating servers connected to the computer network, the reward to be distributed after a consumer visits a web site of the paying merchant, the architecture comprising:

a) a checkpoint server, for recording each access by the consumer of a participating merchant web site, including access by the consumer of the paying merchant web site;

b) an accounting server, for accepting referral points issued by the paying merchant when a consumer accesses a pre-determined web site of the paying merchant, and for distributing to participating merchants the referral points according to criteria that limit the number of participating merchants, the criteria including a requirement that the consumer have visited a web site of a participating merchant before visiting the pre-determined web site of the paying merchant; and c) a merchant database server, for hosting a database of information about each participating merchant needed in performing the service, the information including a pass-on percentage, and for a paying merchant also a number of referral points the paying merchant agrees to issue for distribution to participating merchants whenever a consumer visits an indicated web site of the paying merchant.

8. The architecture of claim 7, wherein the criteria include a requirement that the consumer visit a participating merchant within a pre-determined time before the consumer visits the pre-determined web site of the paying merchant in order for the participating merchant to be awarded a portion of the referral points.

9. The architecture of claim 7, wherein the criteria include a requirement that after last visiting a participating merchant before the consumer visits the pre-determined web site of the paying merchant, the consumer not visit more than a pre-determined number of other participating merchants in order for the participating merchant to be awarded a portion of the referral points.

* * * * *

UNITED STATES PATENT AND TRADEMARK OFFICE
CERTIFICATE OF CORRECTION

PATENT NO. : 6,289,318 B1
DATED : September 11, 2001
INVENTOR(S) : Timothy P. Barber Page 1 of 1

It is certified that error appears in the above-identified patent and that said Letters Patent is hereby corrected as shown below:

Column 1,
Line 27, "contracts" should be -- contacts --
Line 67, "advertising" should be -- advertisement --

Column 4,
Line 30, "sire" should be -- site --
Line 31, second occurrence of "merchant" should be -- merchants --
Line 39, before "paying" -- a -- should be inserted
Line 47, second occurrence of "merchant" should be -- merchants --

Column 6,
Line 43, after "and" -- , -- should be inserted

Column 9,
Line 31, "second" should be -- seconds --

Column 10, claim 1,
Line 32, "and" should be deleted

Column 10, claim 4,
Line 64, "access" should be -- accesses --

Signed and Sealed this

Twelfth Day of March, 2002

Attest:

*Attesting Officer*

JAMES E. ROGAN
*Director of the United States Patent and Trademark Office*